US005429402A

United States Patent [19]

Kennedy

[11] Patent Number: 5,429,402

[45] Date of Patent: Jul. 4, 1995

[54] MAGNETIC BROOM UTILIZING FLEXIBLE MAGNETIC FINGERS

[76] Inventor: Patricia B. Kennedy, Box 810 Emerson Dr., Charlottesville, Va. 22901

[21] Appl. No.: 197,009

[22] Filed: Feb. 15, 1994

Related U.S. Application Data

[63] Continuation of Ser. No. 862,216, Apr. 2, 1992, abandoned.

[51] Int. Cl.[6] .......... B03C 1/30; B25J 15/06

[52] U.S. Cl. .......... 294/65.5; 15/160; 209/215

[58] Field of Search .......... 294/65.5; 15/104.001, 15/105, 106, 160, 197, 200; 56/400.01, 400.04, 400.11, 400.16, 400.17, 400.21; 209/212, 215-217, 223.1; 335/285, 287, 291, 293, 296, 302, 306

[56] References Cited

U.S. PATENT DOCUMENTS

| | | | |
|---|---|---|---|
| 1,630,987 | 5/1927 | Turner | 209/217 X |
| 1,831,393 | 11/1931 | Pierce | 335/285 X |
| 2,056,906 | 10/1936 | Parkhill | 294/65.5 X |
| 2,202,695 | 5/1940 | Kinney | 15/200 X |
| 2,415,730 | 2/1947 | Davis | 294/65.5 X |
| 2,873,136 | 2/1959 | Bennet | 294/65.5 |
| 2,932,538 | 4/1960 | Holmes | 294/65.5 |
| 3,111,699 | 11/1963 | Comeau | 15/200 X |
| 3,503,645 | 3/1970 | Huddy | 294/65.5 |
| 4,017,386 | 4/1977 | Barry | 294/65.5 X |
| 4,652,845 | 3/1987 | Finkle | 294/65.5 X |

FOREIGN PATENT DOCUMENTS

| | | | |
|---|---|---|---|
| 77878 | 4/1894 | Germany | 294/65.5 |
| 311343 | 7/1917 | Germany | 294/65.5 |
| 179394 | 11/1935 | Switzerland | 15/197 |
| 2069033 | 8/1981 | United Kingdom | 209/215 |
| 1449506 | 1/1989 | U.S.S.R. | 294/65.5 |

*Primary Examiner*—Johnny D. Cherry
*Attorney, Agent, or Firm*—Seymour Levine

[57] ABSTRACT

Magnetic finder fingers, made of a flexible magnetic material are positioned in a holder in a manner to provide independent movement for each. The independent movement permits the fingers to be swept over a surface to retrieve metallic objects. An alternate arrangement has the magnetic finder fingers in a holder so that the entire length of each magnetic finder finger may be placed in contact with the surface.

3 Claims, 1 Drawing Sheet

MAGNETIC BROOM UTILIZING FLEXIBLE MAGNETIC FINGERS

This is a continuation of application Ser. No. 07/862,216, filed Apr. 2, 1992, now abandoned.

BACKGROUND OF THE INVENTION

1. Field of the Invention

The invention pertains to the field of object retrieval and more particularly to the retrieval of metallic objects by magnetic devices.

2. Description of the Prior Art

Metal objects, such as needles, knife blades, and other surgical instruments dropped in an operating room during surgical procedures or in other hospital areas are currently retrieved manually or with the utilization of a rigid T-shaped rigid roller device having two circular magnets positioned between a center section and two rubber wheels, the T being completed by a handle attached to the center. Manual retrieval is uncertain, having a high probability that needles and small instruments will not be found. Though retrieval with the T-shaped magnetic device is more efficient and provides a higher probability that all needles, knife blades, and instruments will be retrieved than manual retrieval, the elevation of the magnetic rods by the rubber wheels and the finite magnetic strength of the magnets create a strong possibility that not all needles and small instruments will be retrieved. Further, the bulk of the wheels and magnets renders the magnetic rod device unable to reach under and between items of furniture where the needles, knife blades, and small instruments may at times be located. It is imperative that all needles and operating instruments be retrieved and accounted for at the conclusion of an operation. Consequently, a device which will retrieve all needles and instruments, regardless of size, with a 100% probability is required.

SUMMARY OF THE INVENTION

In accordance with the principles of the invention a metallic object retriever includes flexible magnetic fingers adjacently positioned in a holder which is attached to a handle so that a broom-like device is provided. In use the magnetic fingers are in contact with the floor. This contact insures that all metallic objects over which the magnetic broom passes are retrieved. The flexibility of the magnetic strip allows the magnetic broom to be inserted into regions having low clearance and to reach into generally inaccessible corners.

DESCRIPTION OF THE PREFERRED EMBODIMENTS

Figure 1:
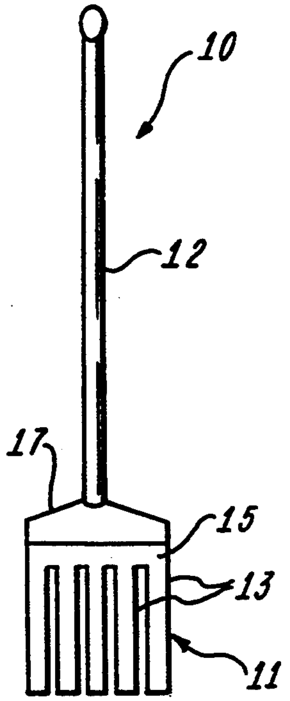
FIG. 1 is an illustration of magnetic finder fingers attached to a handle.

Refer now to FIG. 1 wherein a metal object finder, such as a magnetic broom in accordance with the invention is generally indicated at 10. A flexible metallic attractor 11 is attached to a handle 12 in a manner that allows the sweeper to easily control the magnetic finder fingers and maneuver them over a surface to completely cover the area, including inaccessible regions under chairs, drape-covered beds and tables, into corners, and crevices.

Figure 2:
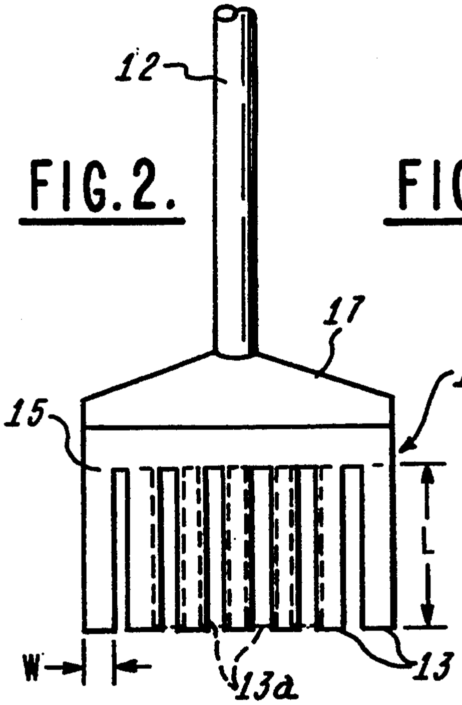
FIG. 2 illustrates a magnetic finder finger arrangement which may be utilized in the embodiment of FIG. 1.

Refer now to FIG. 2, with continued reference to FIG. 1. In FIGS. 1 and 2, and all subsequent figures, like elements are assigned the same reference numeral. The metallic attractor 11 may comprise a plurality of magnetic finder fingers 13, which may be five (5) or more, each having a width W that is five (5) inches, a length L that is six (6) inches and a thickness T (shown in FIG. 3) that is one quarter ($\frac{1}{4}$) of an inch. These magnetic finder fingers 13 may be made of a flexible magnetic permanently magnetized material having sufficient magnetic strength to attract metallic objects, such as needles, knife blades, and surgical steel instruments, as for example, ALLMAG 60 made by magna Visual Inc. and designated product number A1-6967. The magnetic finder fingers 13 of the magnetic attractor 11 may be cut from a sheet 15 of flexible magnetic material which may be firmly held in a holder by a holder 17. Alternatively, the magnetic attractor may comprise individual magnetic finder fingers 13 positioned and firmly held in the holder 17.

Figure 3:
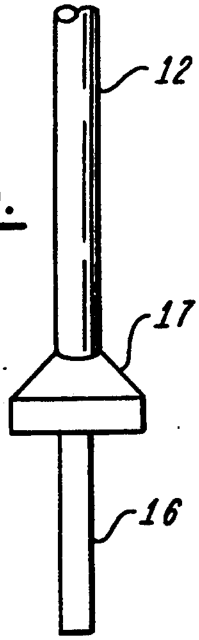
FIG. 3 illustrates a single row configuration of finder fingers for the embodiment of FIG. 1.
Figure 4:
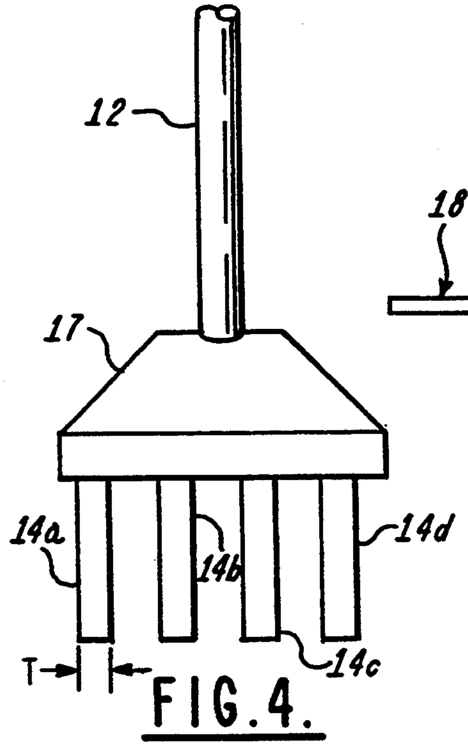
FIG. 4 shows a multi-row finder finger arrangement which may be utilized in the embodiment of FIG. 1.

FIG. 3 shows a magnetic attractor with a single row 16 of magnetic finder fingers. It should be appreciated that more than one row of magnetic finder fingers 13 may be employed for the magnetic attractor 11. Each of these rows may have the magnetic finder fingers contained therein positioned in alignment with the magnetic finder fingers of the previous row. An alternate arrangement may position the magnetic finder fingers of one row offset from that of another, with alternate rows having the magnetic finder fingers in alignment. An offset arrangement is indicated in FIG. 2, wherein the magnetic finder fingers 13*a*, indicated by the dotted lines, of the second row are offset by one half the width W from the position of the magnetic finder fingers 13 in the first row. FIG. 4 is a side view of a multiple row magnetic attractor 14. Four rows 14*a*–14*d* are shown, though any number may be utilized. It should be recognized that the magnetic finder fingers in one row may have the same or opposite or polarization with respect to the magnetic finder fingers in an adjacent row if the spacing is properly chosen. Should the rows be too closely spaced and the finder fingers in a row have a polarization that is opposite to that of the finder fingers in the adjacent row, the finder fingers will attract, closing the gap between the rows and reducing the metallic object attractive force. When the finder fingers in a row have the same polarization as that of the adjacent row, the resulting repulsive force tends to widen the spacing between the rows. This gap widening tendency, however, does not reduce the metallic object attractive force. If more than two rows are provided, the repulsive force on either side of the interior rows will maintain the constant spacing without reduced efficiency.

Figure 5:
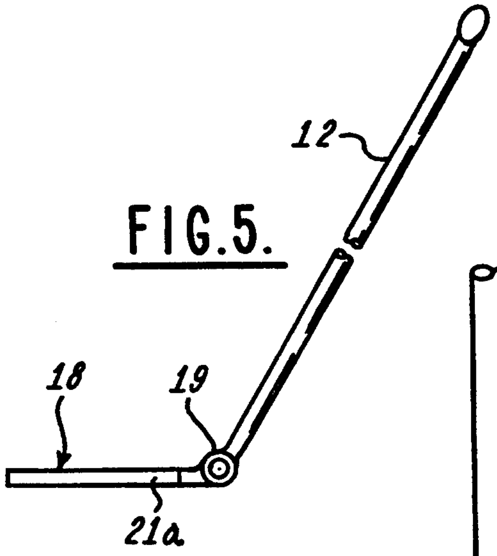
FIG. 5 illustrates an embodiment of the invention wherein magnetic binder fingers are attached to a handle to be parallel or in contact with a surface to be swept.
Figure 6:
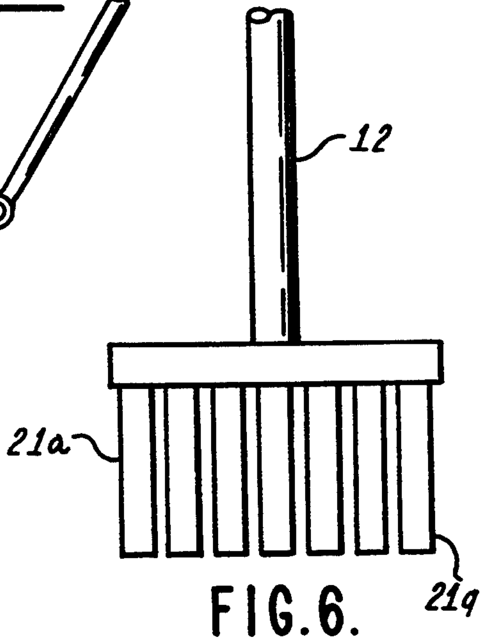
FIG. 6 illustrates a magnetic finder finger arrangement which may be utilized in the embodiment of FIG. 2.

Refer now to FIGS. 5 and 6, wherein a magnetic attractor 18 comprises a single row of magnetic finder fingers positioned in a holder 19 which places the entire length of each finger on or parallel to the surface that is to be swept of magnetic objects. In this embodiment the magnetic finder fingers may be individual strips 21_a_ through 21_g_. These strips may have the dimensions previously described with respect to the strips 13 of FIGS. 1 and 2. In this configuration the magnetic attractor may be moved across the surface along swatches that are as wide as the magnetic finder fingers 21_a_–21_g_ are long. Thus, a systematic movement across the surface insures that all magnetic objects will be retrieved. It should recognized that the magnetic finder fingers 21_a_–21_g_ may be formed from a single sheet of flexible material, as previously discussed with respect to the magnetic finder fingers 13.

While the invention has been described in its preferred embodiments, it is to be understood that the words that have been used are words of description rather than limitation, and that changes may be made within the purview of the appended claims without departing from the true scope and spirit of the invention in its broader aspects.

I claim:

1. A magnetic broom for retrieving metallic objects from a surface comprising:

a plurality of independently movable permanently magnetized flexible magnetic strips each having a predetermined length, said flexible magnetic strips being permanently magnetized over all of said predetermined length, each of said flexible magnetic strips having a flexibility for selectively contacting said surface from ends of said predetermined length through substantially all of said predetermined length; and control means coupled to said plurality of flexible magnetic strips for controlling and maneuvering said plurality of flexible magnetic strips.

2. The magnetic broom of claim 1 wherein said control means includes a holder having an axis, said plurality of flexible magnetic strips being positioned in said holder in a manner to provide at least one row containing flexible magnetic strips, said flexible magnetic strips in said at least one row being parallel to said axis when said axis is vertically positioned and said plurality of magnetic strips are not contacting said surface.

3. The magnetic broom of claim 2 wherein said flexible magnetic strips are positioned in said holder to provide a multiplicity of flexible magnetic strip rows, said flexible magnetic strips in adjacent rows having magnetic polarizations which establish a repulsive magnetic force therebetween.

* * * * *